United States Patent [19]

Cooper et al.

[11] Patent Number: 5,392,810
[45] Date of Patent: Feb. 28, 1995

[54] PLATES FOR WAFER CHECK VALVES

[75] Inventors: James N. Cooper, Huddersfield; Nicholas J. Harrop, Rotherham, both of England

[73] Assignee: Goodwin International Limited, United Kingdom

[21] Appl. No.: 166,524

[22] Filed: Dec. 13, 1993

[30] Foreign Application Priority Data

Dec. 1, 1993 [GB] United Kingdom ............... 9324697

[51] Int. Cl.⁶ ............................................. F16K 15/03
[52] U.S. Cl. ................................. 137/512.1; 137/527; 251/334
[58] Field of Search ............................ 137/512.1, 527; 251/334, 358

[56] References Cited

U.S. PATENT DOCUMENTS

| | | | |
|---|---|---|---|
| Re. 30,532 | 3/1981 | Buckner | 137/512.1 |
| 386,461 | 7/1888 | Goll | 137/527 |
| 505,792 | 9/1893 | Henn | 137/527.2 |
| 1,438,161 | 12/1922 | Zimmerman | 251/358 X |
| 2,358,101 | 9/1944 | Randall | 137/527 X |
| 2,756,017 | 7/1956 | Silverman | 137/527.8 X |
| 2,877,792 | 3/1959 | Tybus | 137/512.1 |
| 2,900,999 | 8/1959 | Courtot | 251/334 X |
| 3,072,141 | 1/1963 | Wheeler, Jr. | 137/512.1 |
| 3,074,427 | 1/1963 | Wheeler, Jr. | 137/512.1 |
| 3,144,876 | 8/1964 | Frye | 137/454.5 |
| 3,295,550 | 1/1967 | Scaramucci | 137/527.4 |
| 3,433,250 | 3/1969 | Hagihara | 251/334 X |
| 3,452,778 | 7/1969 | Babcock | 137/512.1 |
| 3,538,946 | 11/1970 | Hilsheimer | 137/512.1 |
| 3,678,958 | 7/1972 | Satterwhite et al. | 137/512.1 |
| 3,934,608 | 1/1976 | Guyton | 137/527.8 |
| 3,965,926 | 6/1976 | Buckner | 137/512.1 |
| 4,005,732 | 2/1977 | Buckner | 137/512.1 |
| 4,043,358 | 8/1977 | Sliski | 137/512.1 |
| 4,079,751 | 3/1978 | Partridge et al. | 137/512.1 X |
| 4,121,607 | 10/1978 | Bader | 137/527 X |
| 4,196,745 | 4/1980 | Schützer | 137/512.1 |
| 4,230,148 | 10/1980 | Ogle, Jr. | 137/512.1 |
| 4,249,567 | 2/1981 | Weiss | 137/512.1 X |
| 4,257,444 | 3/1981 | Ogle, Jr. et al. | 137/512.1 X |
| 4,257,451 | 3/1981 | Paton | 137/512.1 |
| 4,368,755 | 1/1983 | King | 251/334 X |
| 4,694,853 | 9/1987 | Goodwin | 137/512.1 |
| 4,867,199 | 9/1989 | Marx | 137/512.1 |
| 4,896,695 | 1/1990 | Pysh | 137/512.1 |
| 4,977,926 | 12/1990 | Hocking | 137/512.1 |
| 5,246,032 | 9/1993 | Muddiman | 137/512.1 |

FOREIGN PATENT DOCUMENTS

| | | |
|---|---|---|
| 0361731 | 4/1990 | European Pat. Off. . |
| 948235 | 1/1964 | United Kingdom ............ 137/512.1 |
| 2022781A | 12/1979 | United Kingdom . |
| 2112671A | 7/1983 | United Kingdom . |

*Primary Examiner*—John Rivell
*Attorney, Agent, or Firm*—Harness, Dickey & Pierce

[57] ABSTRACT

A metal plate 20 for a dual plate wafer check valve.

A central portion 36 of the D shaped plate 20 is reinforced such as by means of a raised area 36 on either or both sides of the plate to resist deformation when subjected to reverse pressure in the valve closed position, while the D shaped edge portion 32 of the plate is made sufficiently flexible to maintain or improve sealing engagement with a valve seat even when the valve seat is distorted by the effect of reverse pressure in the valve closed position.

11 Claims, 7 Drawing Sheets

PLATES FOR WAFER CHECK VALVES

This invention relates to plates for dual plate wafer check valves.

Known dual plate wafer check valves comprise an annular housing with two substantially semi-circular, or D-shaped, valve members or plates pivotally mounted on a diametral hinge pin. These plates can take up a valve closed position in which they shut respective semi-circular or D shaped apertures defined in the housing by a diametral cross piece. The plates are generally spring-urged towards the closed position. They can be urged by pressure of a given level on the upstream side of the valve towards an open position in which they lie generally parallel to the housing axis. The plates may be provided with a shock bumper in the form of a lug projecting from the semi-circular edge on the side of the plate which does not contact the valve seats surrounding the semi-circular openings. Generally there is also a stop pin provided parallel to the hinge pin which prevents either flap from pivoting more than 90° from the valve closed position.

Wafer check valves are non-return valves which open in response to pressure of a given level on the upstream side, that is to say pressure applied to the plates via the semi-circular openings. As pressure decreases, and the flow rate drops, the plates are urged by reverse pressure, in some cases with the assistance of spring means, towards the valve closed position. Duel plate wafer check valves have a number of advantages over swing check valves comprising a single plate or flap hinged tangentially. Dual plate wafer check valves find particular application where their lightness, compact size and relatively fast closure response offer advantages over swing check valves.

While wafer check valves may have plates of plastic or formed from sheet metal for low pressure applications, plates for high pressure applications, i.e. those of 300 Class ANSI pressure rating (PN 50) and above, are generally cast or forged metal plates.

A limitation of the use of known dual plate wafer check valves reliant on a metal-to-metal seal is their performance with regard to reverse flow leakage compared with other check valves.

This limitation is recognised in the international and national standards, for example API 598 which permits metal seated dual plate wafer check valves to have a greater leakage than other types of valve, such as swing check valves which are capable of zero leakage with a metal seat. While the problem of reverse flow leakage may for some applications be overcome by the provision on the valve seat of an elastomer seal, this solution is not available for other applications, such as cryogenic and high temperature use.

Dual plate wafer check valves have been in use for over thirty years. The unfavourable reverse leakage performance characteristics of such check valves have been known to be a feature of the two D shaped seats on the body and the two independent D shaped plates pivoting around a hinge pin.

The performance on reverse flow leakage is due to reverse pressure on the D shaped valve plate. Specifically the reverse pressure may be considered as giving rise to a force which resultantly operates on the centre of pressure which is on the centre line of the D approximately one third of the way from the diameter. This causes the D shaped valve members to bow or flex. This flexing is not uniform, but is greatest at the corners or ears of the D shape of the valve plate and it is at this point that leakage is first seen.

In an effort to minimise leakage in higher pressure fluid systems with increasing back pressure, the known wafer check valves use increasing plate thicknesses and increasing rigidity, and so thickness, of the seat area, for example by increasing the cross section area of the diametral bar and the circumferential seating area. The intention is to provide maximum rigidity against distortion by the back pressure in an attempt to maintain as much contact as possible between the plate and the seat area, particularly at the "ear" area. This means using an increased amount of material for the valve plates for high pressure use. This adds to the cost. Further, the use of thicker plates decreases the flow area and increases pressure drop across the valve. The heavier weight of the sealing plates, which may be substantial on larger sized valves in the high pressure ranges, also gives rise to increased friction and wear on the hinges of the plates, reducing the performance of the valve and increasing closing response time. This reduction in performance increases the likelihood of the plates slamming shut causing increased wear, noise and potential damage to other line equipment.

According to the invention there is provided a metal plate for a dual plate wafer check valve comprising non-reinforced end portions and a reinforced central portion. Preferably the metal plate is cast or forged and the central area is reinforced by means of a raised area on one or both sides of the plate.

According to a further aspect of the present invention there is provided a check valve comprising:
a valve body;
a valve seat having an upstream and a downstream side comprising:
 an annular seat member; and
 a diametral cross member
 said annular seat member and said diametral cross member defining a pair of substantially D shaped apertures
a pair of substantially D shaped plates pivotally connected to a diametral hinge pin arranged parallel to said diametral cross member of said valve seat on the downstream side thereof
said plates being pivotal between a valve open position and a valve closed position said D shaped plate member having a predetermined thickness with a centrally located portion and end portions extending from the central portion, means for pivotally mounting said plate for rotation about an axis parallel to and adjacent to straight edge of the D, said central portion including a reinforcement increasing the thickness of the plate in the central portion, when back pressure acts on said plate, said reinforcement limiting bowing of said D shaped plate member and said central and end portions distorting which enables the end portions of the plate to maintain sealing contact with a seat.

The invention approaches the problem of reverse flow leakage of dual plate wafer check valves by a novel design approach which ensures a seal is maintained, and indeed improved, at elevated reverse pressures. In contrast to the known approach of making the valve seat and plates more rigid to try to prevent distortion of either, the present invention works on the theory that leakage is a feature of the way the plate distorts under even small loads and designs the plate to enable the ends of the sealing plate to distort to maintain sealing contact with the body. This is achieved by combining flexibility of the plate ends with rigidity of the central area of the plate.

The invention will be more clearly understood from the following description given only by way of example, reference being made to the accompanying drawings in which.

Figure 1:
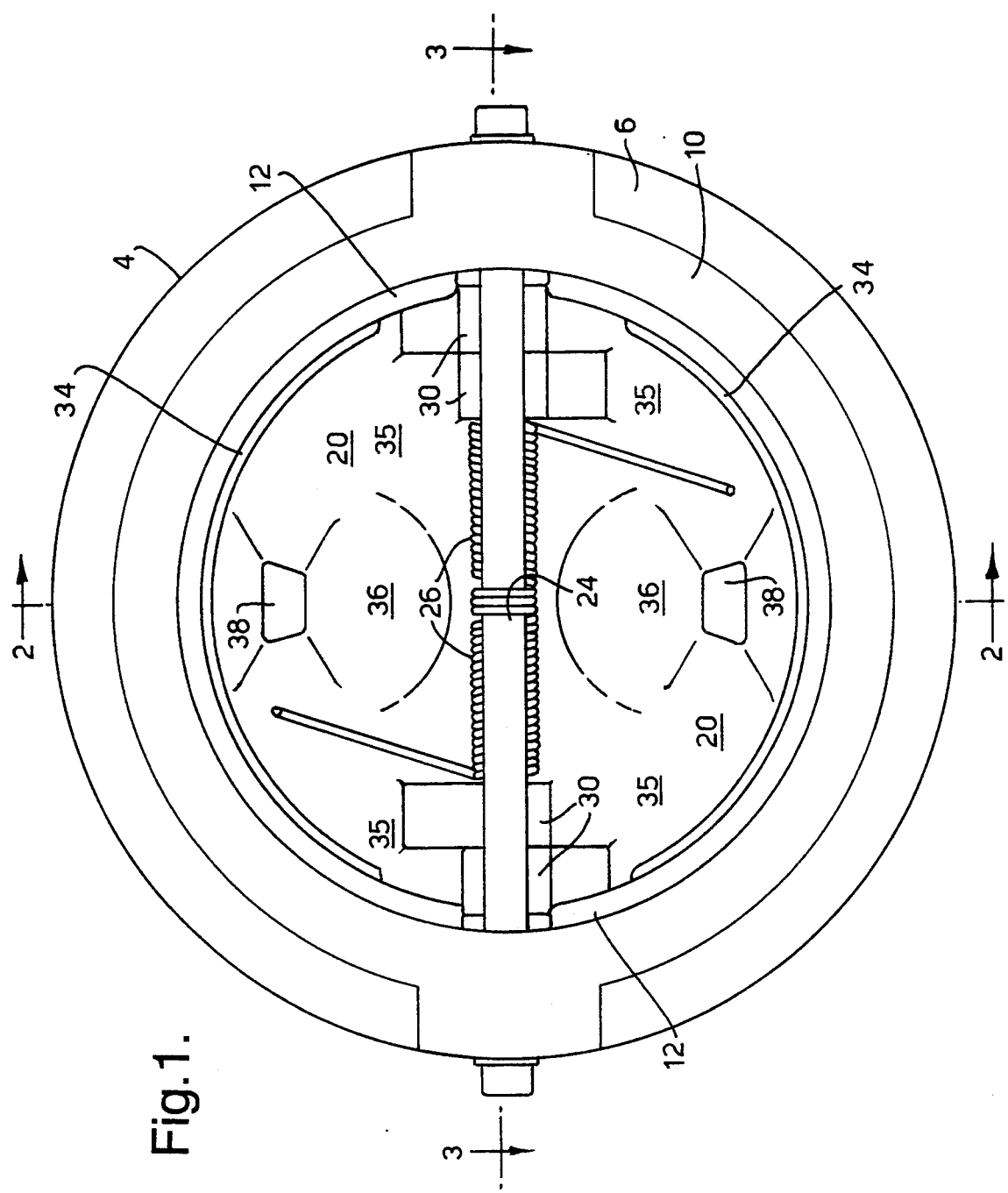
FIG. 1 is an axial end elevation of one embodiment of a wafer check valve of the present invention.
Figure 2:
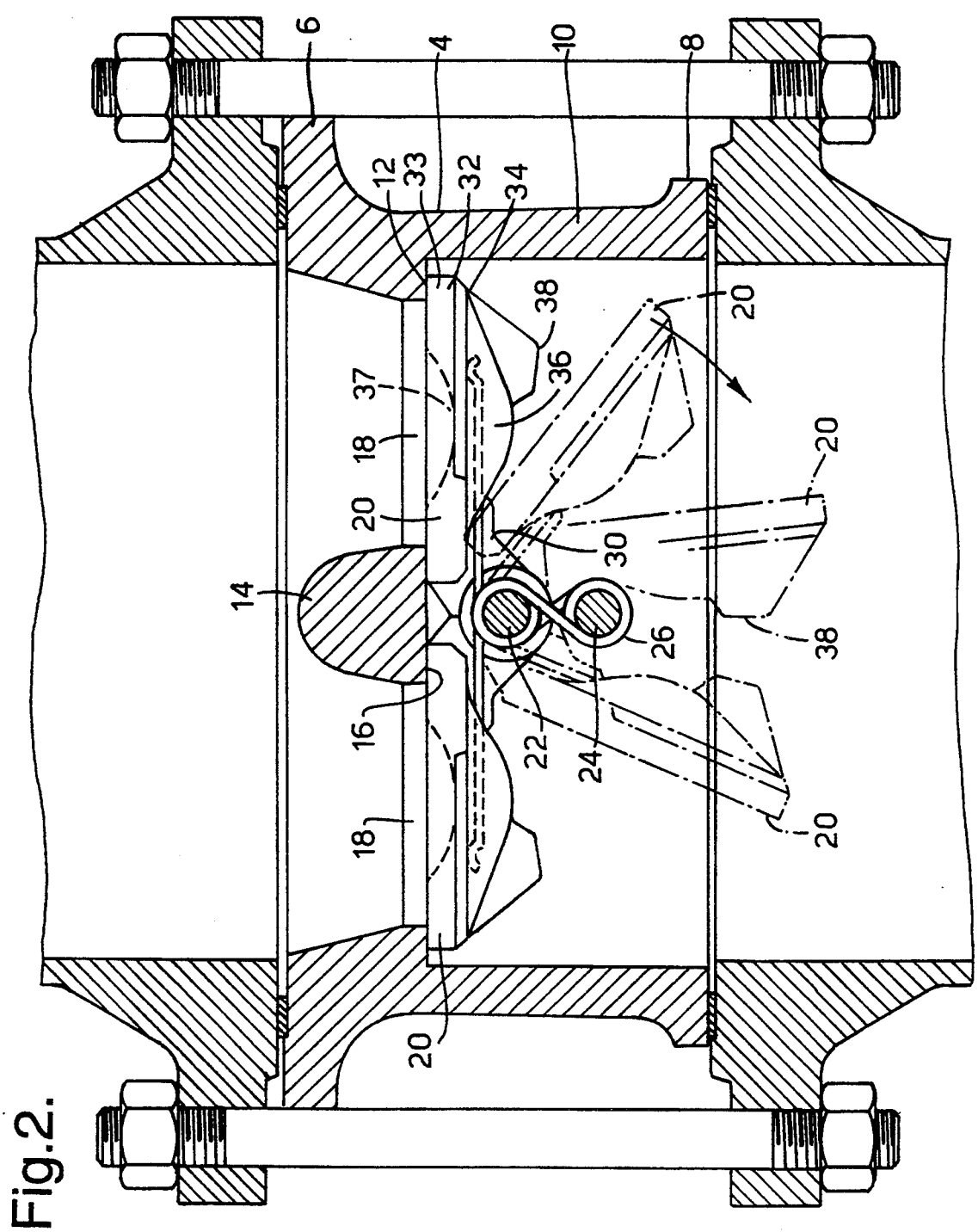
FIG. 2 is a diametral cross-sectional view along the line 2—2 of FIG. 1.
Figure 3:
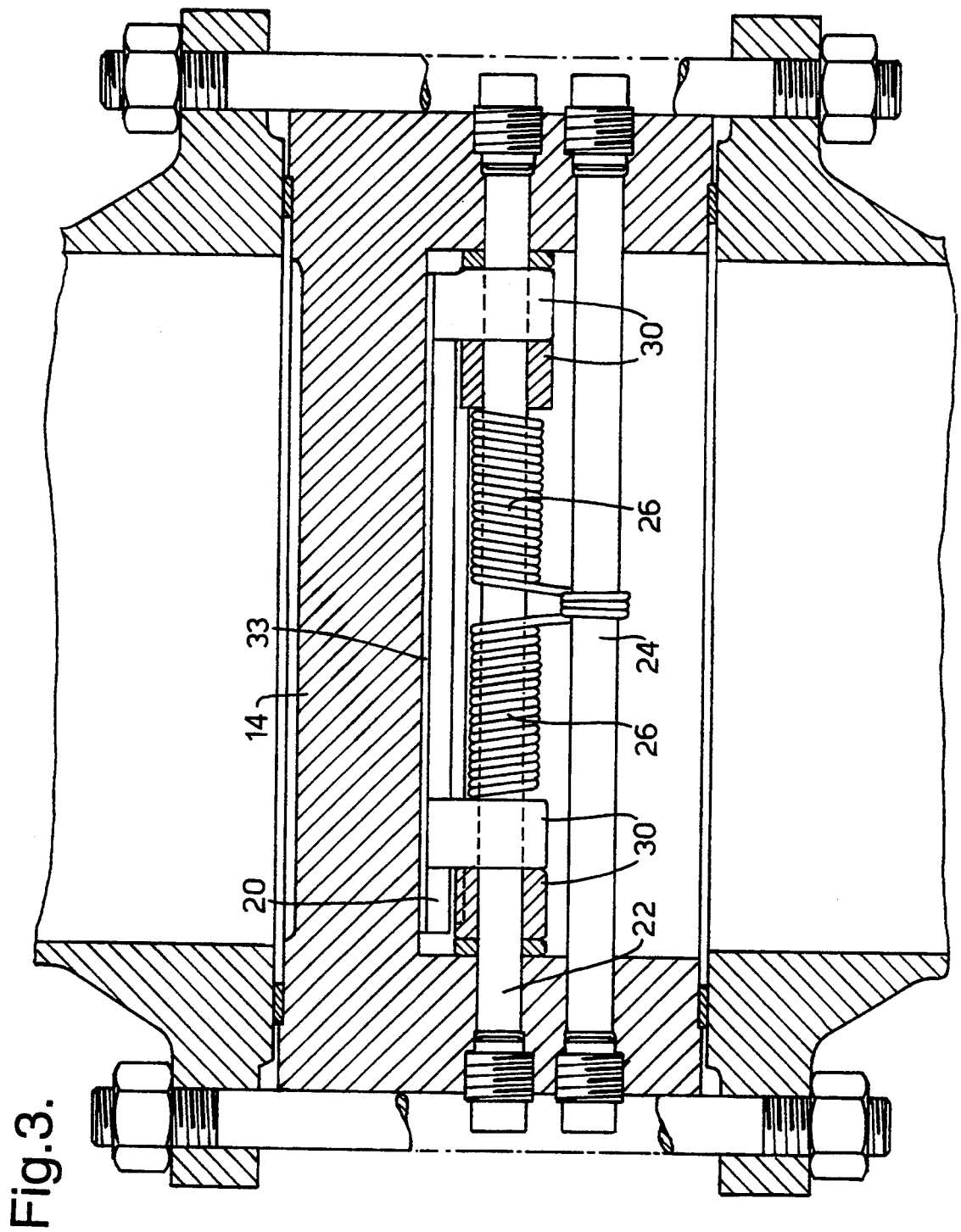
FIG. 3 is a diametral cross-sectional view along the line 3—3 of FIG. 1.

The valve diagrammatically shown in FIGS. 1, 2 and 3 comprises a valve body 4 having a generally hollow cylindrical shape. The body has end flanges 6 and 8 located at either end of a generally cylindrical side wall 10 for connecting the valve to a line assembly. Inwardly projecting from side wall 10, and generally integrally formed therewith, is an annular seat member 12. Annular seat member 12 together with a diametral cross member 14 comprise a substantially planar valve seat area 16. Annular seat member 12 and diametral cross member 14 together define two D shaped apertures 18 through which fluid may flow from an upstream side of the valve seat to a downstream side thereof, that is from top to bottom of FIGS. 2 and 3.

First and second generally semi-circular plates 20 are pivotally connected to a hinge pin 22 extending diametrally across the valve body 4 parallel to cross member 14. In the valve closed position, the two generally semi-circular or D shaped plates 20 are pivoted around hinge pin 22 into sealing contact with the annular seat member 12 and diametral cross member 14 of the valve seat 16. Stop pin 24 extends diametrally across the valve body 4 parallel to hinge pin 22 to limit the degree of opening of valve plates 20. Optionally a spring or springs 26 bias the two valve plates 20 into sealing contact with the valve seat 16.

D shaped valve plate 20 comprises hinge member 30, for pivotal connection to hinge pin 22. Valve plate 20 further comprises a substantially D shaped periphery 32, having, on a first upstream side, a flat seat face 33 for sealing with valve seat 16 and, on a second downstream side, an edge bevel 34. Centrally there is provided a mound 36 projecting towards the downstream direction with a relief or hollow 37 on the upstream central portion of valve plate 20. A stop member or shock bumper 38, in the form of a projection on the downstream side of the plate cooperates in the valve open position, shown in dotted lines in FIG. 2, with the corresponding stop member on the second valve plate 20.

Reinforcing mound 36 strengthens the central portion of plate 20 against deflection caused by back pressure in the valve closed position. The non-reinforced end portions 35 of the valve plate 20 are comparatively flexible, and may be considerably less thick than prior art wafer check valves for the same pressure capacity.

In the closed position, the action of back pressure acts on the plate 20 which, in turn, distorts the annular seat member 12 and cross member 14 comprising valve seat 16. Reverse flow pressure operating on the valve plate 20 compresses the end portions 35 of the valve into the valve seat. Thus sealing contact is maintained and even improved with increased reverse pressure. Flexibility of the end portions 35 of valve plate 20 means that the reverse pressure causes the end portions to follow distortion so as to maintain sealing contact between said sealing faces 33 and said valve seat 16.

The central mound or dome area 36 provides reinforcement to prevent bowing of the D shaped member 20 by the effect of a resultant force from the back pressure acting at a point on the mid line of the valve plate 20, which bowing would tend to lift the sealing faces 33 away from sealing contact with valve seat 16. Reinforcement by means of a central mound or domed area 36 on the downstream side of the plate 20 additionally helps to distribute the back flow pressure more evenly across the sealing face of the plate 20.

Figure 4:
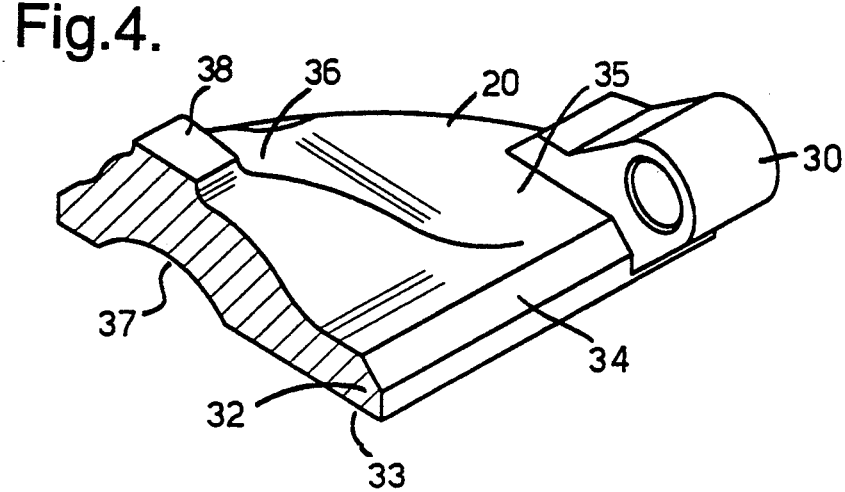
FIG. 4 is a partial view of a valve plate of a first embodiment of the invention.

A variation on this first embodiment of the plate of this invention is shown in partial cross-section in FIG. 4 wherein the stop member 38 is provided in the form of a substantially planar plateau at the peak of mound 36. This enables the shock bumper 38 to be placed at or about the centre of inertia as opposed to the outside edge of the valve plate in the prior art structures. This reduces the load on the hinge and thereby reduces the bending moment on the hinge.

Figure 5:
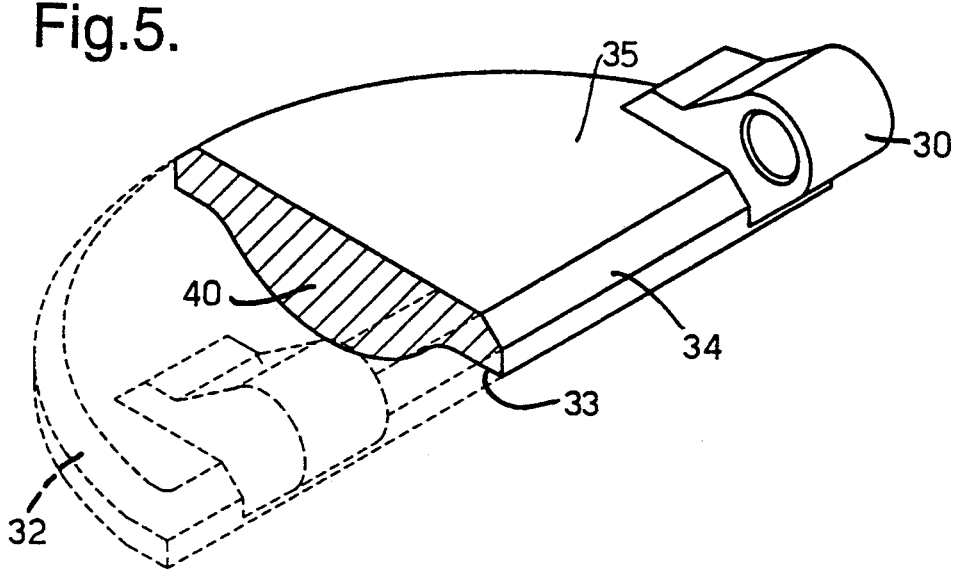
FIGS. 5 and 6 are partial views of two further valve plates of the invention.
Figure 6:
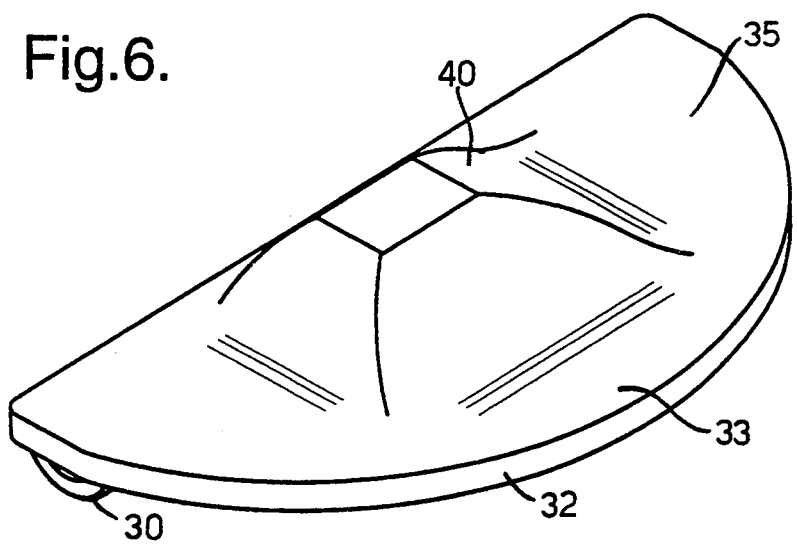
Figure 7:
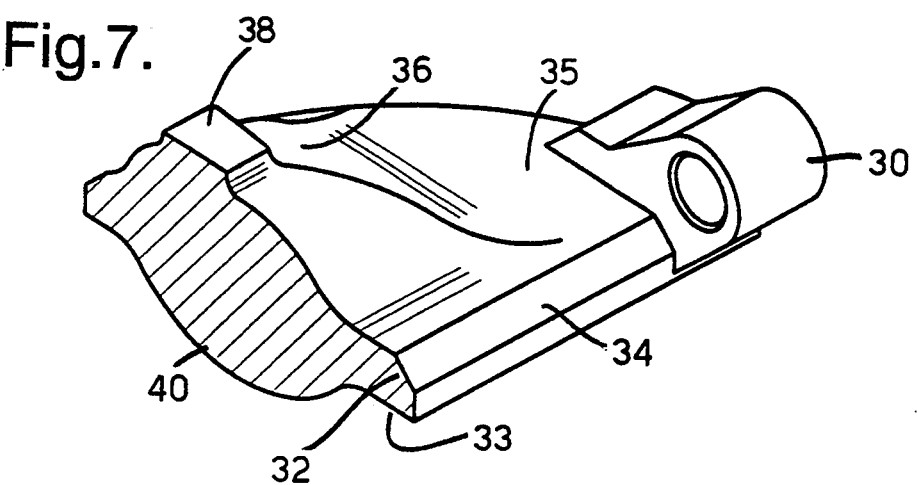
FIGS. 7 and 8 are partial views of two further valve plates of the invention.
Figure 8:
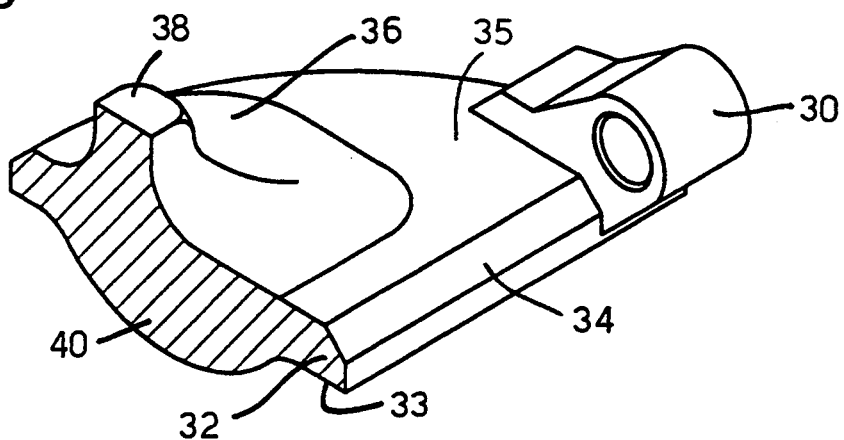
Figure 9:
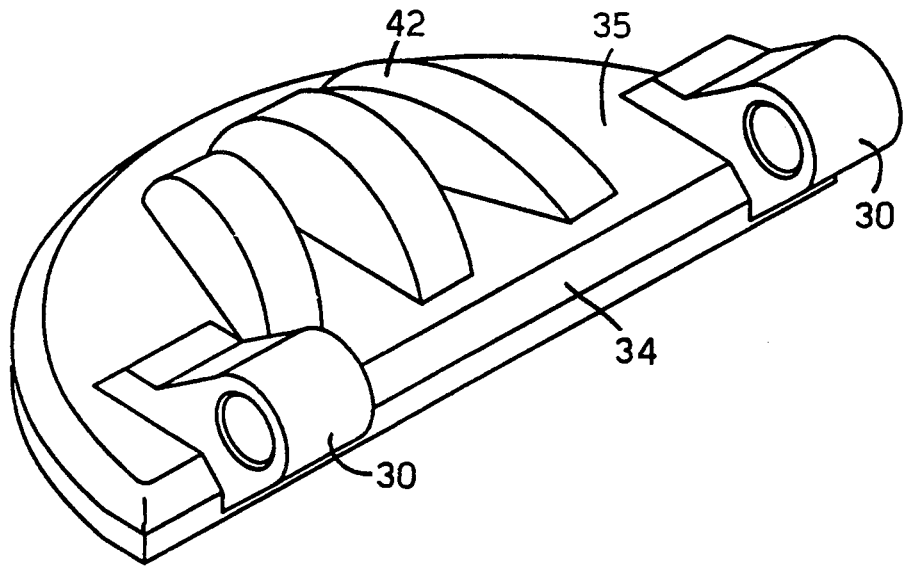
FIGS. 9 to 13 are views of five further valve plates of the invention.
Figure 10:
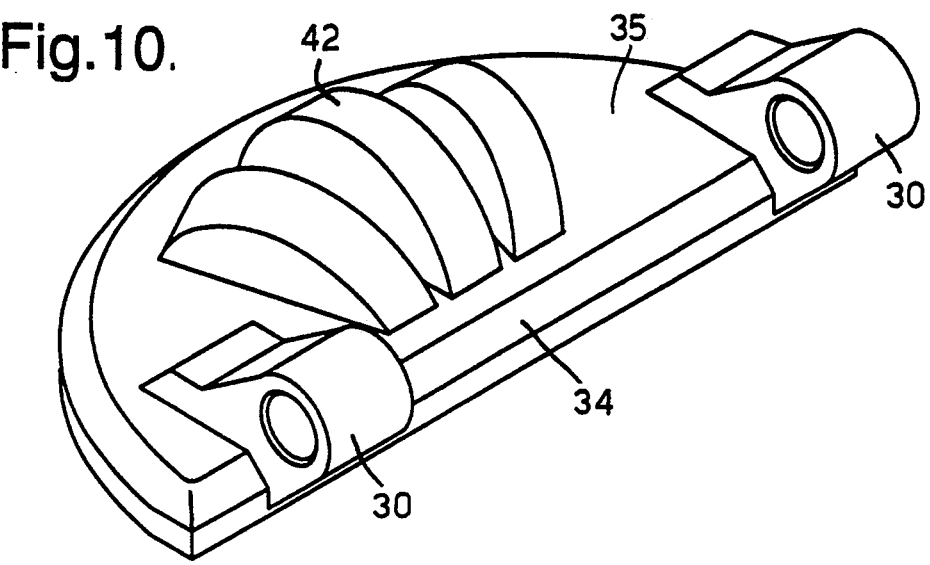
Figure 11:
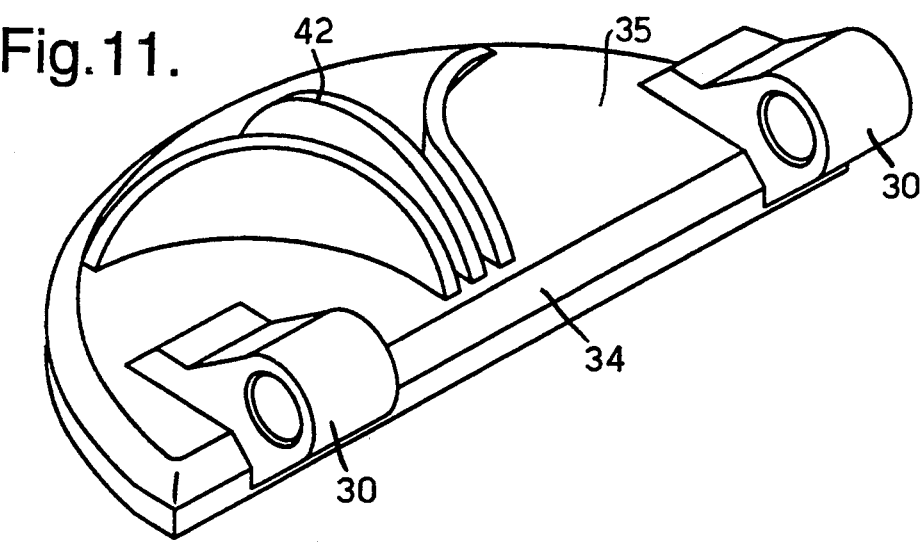
Figure 12:
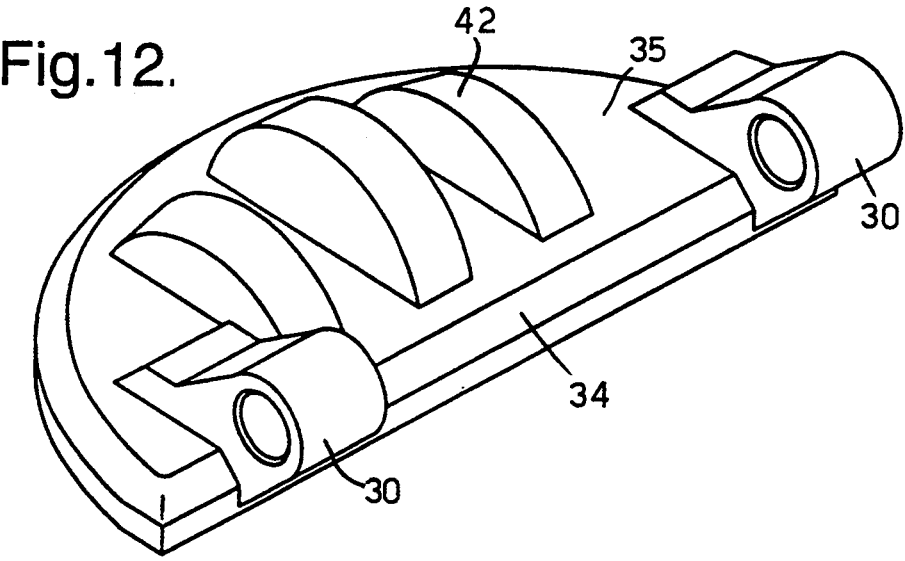
Figure 13:
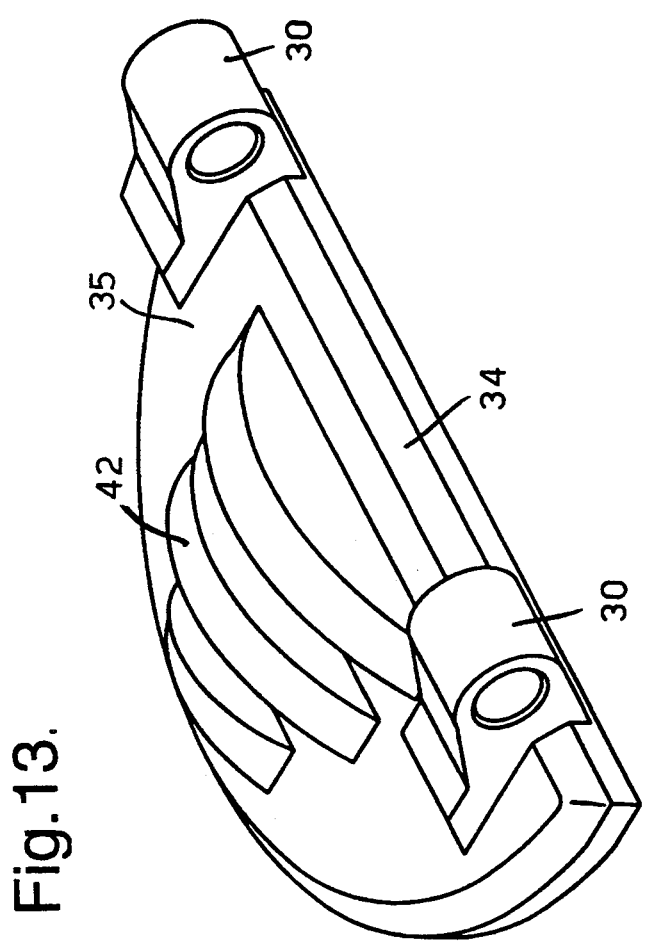

Stiffening of the centre of the plate to prevent concave distortion may take a number of forms. Appropriate stiffening may be provided by a done, mound or projection on the downstream side, as figures 1 to 4, but with the upstream face of the plate being substantially planar. Alternatively a reinforcing section, for example a done, mound, or projection may be provided centrally on the upstream side as illustrated in FIGS. 5 and 6, or a dome, mound or projection may be centrally provided on both the upstream and downstream sides of plate 20 as illustrated in FIGS. 7 and 8. In a further embodiment the reinforcement may take the form of raised ribs as illustrated in FIGS. 9 to 13.

The strengthening of the central portion of plate 20 should act to prevent or limit concave distortion, but should not unduly interfere with the flexibility or ability to distort the end portions 35 of the plate 20. Strengthening should preferably stiffen an area around the centre of pressure of the plate 20 by means of stiffening projections on either or both sides of the plate 20. Advantageously these projections extend to a maximum extent in an area immediately around the centre of pressure and decrease with distance away from this area towards the ends of the plate 20.

The combination of flexibility of the ends and rigidity of the centre combined in the one component enhances the sealing characteristics of a valve comprising such a valve plate 20 by permitting distortion of the end portions 35 to maintain sealing contact of the peripheral sealing face of the valve plate 20 with the contour of the annular seal member 12 and cross member 14 comprising valve seat 16 which may be caused by load when under back pressure in the valve closed position.

The plate 20 may be forged or cast in a suitable metal, for example steel, stainless steel or brass. Alternatively the plate 20 may be formed in a suitable metal by other means, such as stamping.

By using a compound design combining a rigid centre and a non-reinforced end portions, strength and flexibility is placed in the valve plate 20 more exactly where each is required, enabling significant reductions in weight. For example for a prior art ten inch (245 mm) diameter valve with a 300 Class ANSI pressure rating (PN 50), the plate thickness is 0.75 inches (19 mm) nominal. For a 2500 Class ANSI 2500 pressure rating (PN 420) valve of the same diameter the plate thickness is in excess of 1.625 inches (41 mm). The present invention enables use of a plate 20 having a thickness in the end portion area 35 for a 2500 Class ANSI pressure rating (PN 420) valve of less than 0.75 inches (19 mm) nominal, that is to say less than the prior plate for a 300 Class ANSI pressure rating (PN 50) valve.

The novel plate design also provides improved response time in high pressure valves due to the lighter mass of plate 20 and also less wear resulting from lower hinge friction. The thinner plates that may be provided on higher pressure valves increase flow area and reduce pressure drop in the valve, the plates taking up less space in the flow area in the open or partially open position than prior art plates.

The use of a plate 20 with reinforced central section and non-reinforced end portions makes it unnecessary continually to increase the cross section of cross member 14 and the seal area of annular seat member 12 on valve bodies designed for use in higher pressure applications, as in the prior art valves. This enables a further increase in the flow area and efficiency of high pressure valves, and a further reduction in the pressure drop across the valve.

The use of valve plates 20 according to the present invention provides a dramatic improvement in sealing characteristics for metal to metal seating valves, expending the range of applications of wafer check valves incorporating plates according to the present invention. Substantially zero or extremely low reverse leakage rates are obtainable even at elevated pressures, making such valves suitable for use in high pressure fluid lines. Moreover valves incorporating plates according to the present invention may be used in cryogenic (down to −196° C. and below) and high temperature (up to 350° C. and above) fluid line assemblies in particular in applications where zero or extremely low leakage rates are required.

We claim:

1. A metal plate for a dual plate check valve comprising:
    a substantially D-shaped plate member, said D-shaped plate member having a predetermined thickness with a central portion and end portions extending from the central portion, means for pivotally mounting said plate for rotation about an axis parallel to and adjacent a straight edge of the D, said central portion including a reinforcement increasing the thickness of the plate in the central portion, when back pressure acts on said plate, said reinforcement limiting bowing of said D-shaped plate member and said plate distorting which enables the end portions of the plate to maintain sealing contact with a seat.

2. A cast or forged metal plate according to claim 1.

3. A plate according to claim 2 wherein said central portion comprises a raised area on either or both sides of said plate.

4. A plate according to claim 2 wherein said central portion comprises a domed portion.

5. A plate according to claim 2 wherein said reinforcement comprises a plurality of raised ribs.

6. A plate according to claim 2 having a centre of inertia, said plate further comprising a stop element at or adjacent said centre of inertia.

7. A check valve comprising:
    a valve body;
    a valve seat having an upstream and a downstream side comprising:
    an annular seat member; and
    a diametral cross member
    said annular seat member and said diametral cross member defining a pair of substantially D shaped apertures
    a diametral hinge pin arranged parallel to said diametral cross member of said valve seat on the downstream side thereof
    a pair of substantially D shaped plates pivotally connected to said diametral hinge pin and having an upstream side and a downstream side
    said plates being pivotable between a valve open position to a valve closed position, said D shaped plate member having a predetermined thickness with a centrally located portion and end portions extending from the central portion, means for pivotally mounting said plate for rotation about said hinge pine, said central portion including a reinforcement increasing the thickness of the plate in the central portion, when back pressure acts on said plate, said reinforcement limiting bowing of said D shaped plate member, and said plate distorting which the end portions of plate to maintain sealing contact with a seat.

8. A check valve according to claim 7 further comprising
    at least one spring urging the plates to the valve closed position.

9. A check valve according to claim 7 wherein each of said pair of plates comprises a mound which projects on the downstream side of said plate.

10. A check valve according to claim 9 wherein each said plate comprises a relief on the upstream side thereof opposite the mound on the downstream side thereof.

11. A check valve according to claim 9 wherein said plate further comprises a stop member comprising a substantially planar plateau provided at the peak of said mound.

* * * * *

UNITED STATES PATENT AND TRADEMARK OFFICE
CERTIFICATE OF CORRECTION

PATENT NO. : 5,392,810
DATED : February 28, 1995
INVENTOR(S) : Cooper, et al

It is certified that error appears in the above-indentified patent and that said Letters Patent is hereby corrected as shown below:

Column 3, line 2, delete "sealing".

Column 3, line 10, after "elevation" insert --view--.

Column 3, line 23, ";" should be --.--.

Column 4, line 38, "done" should be --dome--.

Column 5, line 14, after "prior" insert --art--.

Column 6, line 37, Claim 7, "pine" should be --pin--.

Column 6, line 42, Claim 7, "which" should be --with--.

Signed and Sealed this

Thirtieth Day of May, 1995

Attest:

BRUCE LEHMAN

*Attesting Officer*     *Commissioner of Patents and Trademarks*